United States Patent [19]

Ezawa

[11] Patent Number: 5,560,460
[45] Date of Patent: Oct. 1, 1996

[54] ONE-WAY CLUTCH

[75] Inventor: Akira Ezawa, Kanagawa-ken, Japan

[73] Assignee: Nikon Corporation, Tokyo, Japan

[21] Appl. No.: 350,621

[22] Filed: Dec. 7, 1994

[30] Foreign Application Priority Data

Dec. 7, 1993 [JP] Japan .................................. 5-306531

[51] Int. Cl.⁶ ............................. F16D 43/16; F16D 43/04
[52] U.S. Cl. ................... 192/46; 192/103 B; 192/105 R
[58] Field of Search .............................. 192/46, 105 CD, 192/105 R, 103 B, 105 CF

[56] References Cited

U.S. PATENT DOCUMENTS

| | | | |
|---|---|---|---|
| 2,739,682 | 3/1956 | Detwiler | 192/46 |
| 2,781,882 | 2/1957 | Burkhardt | 192/105 CD X |
| 3,228,498 | 1/1966 | Zahradnik | 192/46 |
| 3,720,294 | 3/1973 | Plamper | 192/46 |
| 3,928,862 | 12/1975 | Ivester et al. | 192/46 X |

FOREIGN PATENT DOCUMENTS

| | | |
|---|---|---|
| 61-77034 | 4/1986 | Japan . |
| 3-43471 | 9/1991 | Japan . |
| 4-135740 | 12/1992 | Japan . |

*Primary Examiner*—Rodney H. Bonck
*Attorney, Agent, or Firm*—Oliff & Berridge

[57] ABSTRACT

A one-way clutch includes a first engagement element of a rotation transmitting element that is attached to a rotatable drive member. The first engagement element is forced toward a second engagement element that is attached to near the center or to the radially inner perimeter of an annular outer edge of a driven member. When the drive member rotates in one direction, the first and second engagement elements connect and the rotation of the rotatable drive member is transmitted to the rotatable driven member. The rotation transmitting element is connected to the drive member in a manner that allows it to rotate freely and so that the first engagement element may separate from or connect to the second engagement element. The rotation transmitting element is designed with its center of gravity located so that the rotation transmitting element will, through the centrifugal force accompanying the rotation of the rotatable drive member, pivot in the direction that will cause the first and second engagement elements to engage only upon rotation of the rotatable drive member in the one direction.

11 Claims, 4 Drawing Sheets

ONE-WAY CLUTCH

BACKGROUND OF THE INVENTION

1. Field of the Invention

The present invention relates to a one-way clutch that transmits the rotation of a drive member in only one direction to rotation of a driven member.

2. Description of Related Art

Ratchet-style clutches that transmit rotation in only one direction are known. FIGS. 7 and 8(a)–8(b) illustrate such a clutch. In FIGS. 7 and 8(a)–8(b), a drive clutch plate 102 and plate 105 are connected together through hole 102a and spindle 105a so that they can rotate relative to each other. A ratchet claw 103 is provided on a fixed spindle 102b of the drive clutch plate 102. A ratchet arm 103b of ratchet claw 103 contacts a fixed spindle 102c of the drive clutch plate 102. A ratchet claw tooth 103a of ratchet claw 103 engages the cam surface 105c of the secondary driven plate 105 to enable drive plate 102 to drive secondary driven plate 105 as shown in FIG. 8(a). The ratchet claw tooth 103a is pressed against a stepped portion 105(b) of cam surface 105c with a force determined by the resilient force created by the elastic deformation of the ratchet arm 103b. As shown in FIG. 8 (a), when the drive plate 102 rotates in the counter-clockwise direction (shown by arrow A) the stepped portion 105b of the cam surface 105c and the ratchet claw tooth 103a engage to transmit the rotation of the drive plate 102 to the secondary driven plate 105. As shown in FIG. 8 (b), when the drive plate 102 rotates in the clockwise direction (shown by arrow B) the ratchet claw 103 slides past the cam surface 105c, thus allowing the drive plate 102 to rotate without engaging the secondary driven plate 105.

With the clutch described above, friction is generated between the ratchet claw tooth 103a and the cam surface 105c because the ratchet claw tooth 103a of the ratchet claw 103 is pressed against the cam surface 105c by the resilient force of the ratchet arm 103b. Thus, even when the drive plate 102 is rotating freely as shown in FIG. 8(b), some torque is transmitted to the secondary driven plate 105. Simultaneously, a small torque load also appears in the drive plate 102. Hereafter, the torque load of the drive plate 102 during free rotation will be referred to as the free rotation load torque, and the torque transmitted to the secondary driven plate 105 will be referred to as the free rotation torque.

Especially when the clutch described above is used with small precision equipment such as cameras, comparatively large free rotation torque and free rotation load torque are generated when the ratchet claw tooth 103a rides over the stepped portion 105b because the bending length (length in the perimeter direction) of the arm 103b cannot be made sufficiently long in relation to the height of the stepped portion 105b. The pressure of the ratchet claw tooth 103a against the cam surface 105c is designated to be slightly larger than that necessary for proper operation to assure that the claw 103a will positively press against the cam surface 105c, regardless of variations in manufacture of the clutch. Manufacturing differences related to a larger design dimension will cause the pressure to be correspondingly larger than the design pressure.

SUMMARY OF THE INVENTION

An object of the present invention is to provide a one-way clutch that will reduce the free rotation torque and free rotation load torque.

It is also an object of the present invention to reduce the size of the one-way clutch while achieving the torque reductions.

In order to achieve the above and other objects, embodiments of the present invention include a first engagement element that is part of a rotation transmitting element that is rotatably attached to a rotatable drive member. The first engagement element is forced toward a second engagement element that is attached to the inside center or to the outer perimeter of a rotatable driven member. When the rotatable drive member rotates in one direction, the rotatable drive member and the rotatable driven member engage so that the drive member rotatably drives the driven member. Rotation of the drive member in the other direction is not transmitted to the driven member. The rotation transmitting element is attached to the rotatable drive member in a manner that allows the rotation transmitting element to rotate freely relative to the rotatable drive member so that the first engagement element can separate from or connect to a second engagement element of the rotatable driven member.

In a first embodiment of the invention, the center of gravity of the rotation transmitting element is located so that the centrifugal force accompanying the rotation of the rotatable drive member in one direction will cause the rotation transmitting element to rotate in a direction that will cause the first and second engagement elements to engage, thereby connecting the rotatable drive member to the rotatable driven member for rotation together in the one direction. Centrifugal force drives the first engagement element toward the second engagement element. The force driving the first engagement element toward the second engagement element can be established by the position of the center of gravity and of the center of rotation of the rotation transmitting element. There is no need to consider the bending length of the rotation transmitting element because elastic force is not used to urge the first engagement element toward the second engagement element.

In second and third embodiments of the invention, in addition to the rotation transmitting element, an auxiliary element is attached to the rotatable drive member in a manner that allows the auxiliary element to pivot freely relative to the rotatable drive member. The rotation transmitting element rotates with the rotatable drive member in one direction causing the first engagement element to engage the second engagement element due to centrifugal force. The auxiliary element is pivotably attached to the rotatable drive member so that the center of gravity of the auxiliary element separates from the center of gravity of the rotation transmitting element when the drive-side rotating object rotates in the one direction.

The clutch is designed for the axes of the rotation spindles supporting the rotatable drive member and the rotatable driven member to be perpendicular to the direction of gravity, so that even when the centrifugal force that acts on the rotation transmitting element is counteracted by the force of gravity, the auxiliary element is caused to move by centrifugal force and the force of gravity applied to it so as to contact and force the first engagement element of the rotation transmitting element toward the second engagement element.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

First Embodiment

The first embodiment of the present invention is described hereafter, with reference to FIGS. 1 and 2(a)–2(c).

Figure 1:
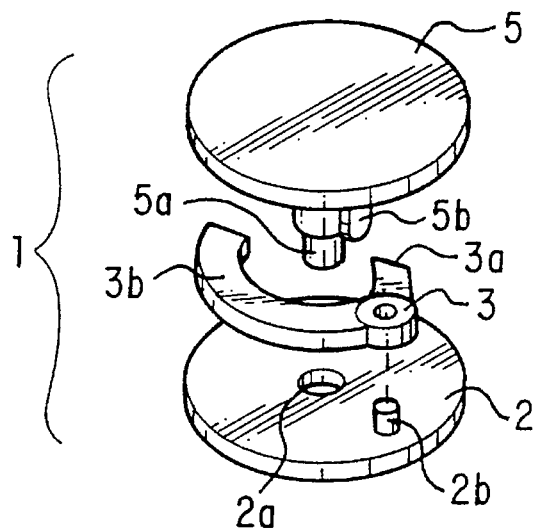
FIG. 1 is an oblique disassembled view that shows the construction of the first embodiment of a clutch in accordance with the present invention.
Figure 2A:
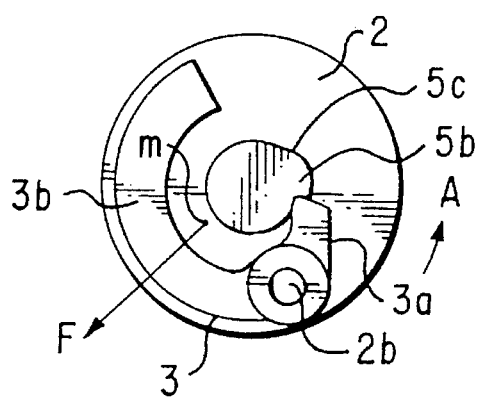
FIGS. 2(a)–2(c) are plan views of the FIG. 1 embodiment that show the interior mechanism of the clutch of the first embodiment.
Figure 2B:
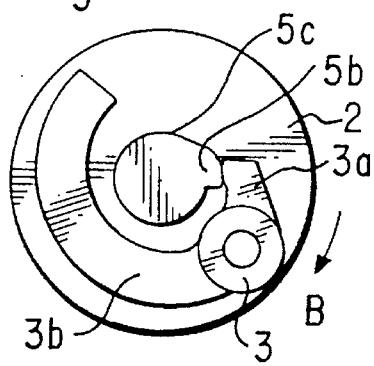
Figure 2C:
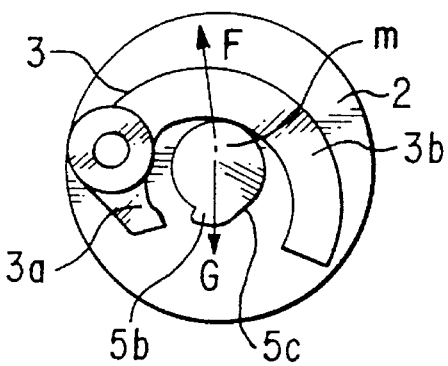

As shown in FIG. 1, the clutch 1 includes a drive plate (or member) 2 and a driven plate (or member) 5 connected so as to rotate freely relative to each other by means of the hole 2a and the spindle 5a. A ratchet claw 3 is installed so as to rotate freely on a fixed spindle 2b of the drive plate 2. The ratchet claw 3 has a tooth portion 3a that can connect to the stepped portion 5b of the driven plate 5 and an arm 3b that extends from the center of rotation to the opposite side of the fixed spindle 2b from the tooth 3a. As shown in FIGS. 2(a)–2(c), the ratchet claw 3 is designed in form and mass distribution so that the centroid m is positioned on the arm 3b side away from the center of rotation (about fixed spindle 2b).

According to the construction described above, a moment develops through the centrifugal force F that accompanies the rotation of the drive plate 2 and acts on the ratchet claw 3. This moment rotates the ratchet claw 3 around the fixed spindle 2b in the counter-clockwise direction as shown in FIGS. 2(a)–2(c). The tooth 3a of the ratchet claw 3 is pressed against a central cam surface 5c of the driven plate 5. Thus, as shown in FIG. 2(a), when the drive plate 2 rotates in the counter-clockwise direction (shown by arrow A) the claw tooth 3a connects with a stepped portion 5b of the cam surface 5c, transmitting the rotation of the drive plate 2 to the driven plate 5. As shown in FIG. 2(b), when the drive plate 2 rotates in the clockwise direction (shown by arrow B) the claw tooth 3a slides past the cam surface 5c, the drive plate 2 freely rotating relative to the driven plate 5.

The pressure of the claw tooth 3a against the cam surface 5c varies according to the rotational speed of the drive plate 2 and the distance from the centroid of the ratchet claw 3 to the fixed spindle 2b. The location of centroid m varies according to the form and mass distribution of the claw tooth 3a and the arm 3b. The pressure decreases as the centroid m approaches the fixed spindle 2b, and the free rotation torque and the free rotation load torque also decrease. If the centroid m is made to approach the center of rotation of the ratchet claw 3, the movement of the centroid m when the claw tooth 3a rides over the stepped portion 5b decreases, and the fluctuations of the free rotation torque and of the free rotation load torque also decrease. Miniaturization of the clutch is achieved because there is no need to elongate the arm 3b in order to decrease the pressure of the claw tooth 3a. For example, if a manufacturing method with a high degree of accuracy is used, such as resin molding, there is little concern that the pressure of the claw tooth 3a will be too large due to manufacturing differences because the position of the centroid m varies little with manufacturing differences.

The clutch 1 of the first embodiment described above is designed for the axes of spindles of the drive plate 2 and of the driven plate 5 to be perpendicular to the direction of gravity. When, however, the rotational speed of the drive plate 2 is small, the centrifugal force F may be smaller than the force of gravity G when the ratchet claw 3 has moved to the top position as shown in FIG. 2(c). Thus the pressure of the claw tooth 3a may be lost. Therefore, it is preferable to use the clutch of the second embodiment, shown in FIGS. 3 and 4(a)–4(b).

Second Embodiment

Figure 3:
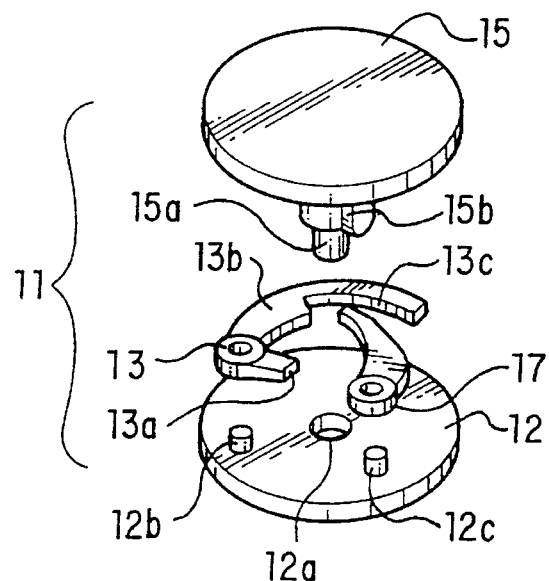
FIG. 3 is an oblique disassembled view that shows the construction of the second embodiment of a clutch in accordance with the present invention.
Figure 4A:
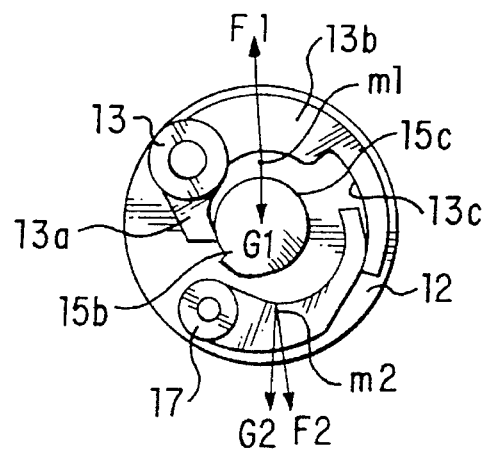
FIGS. 4(a) and 4(b) are plan views of the FIG. 3 embodiment that show the interior mechanism of the clutch of the second embodiment.
Figure 4B:
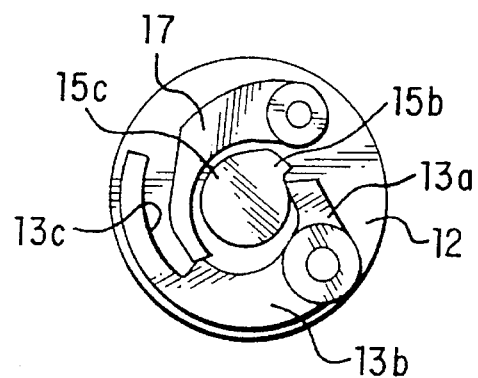

In the second embodiment of the invention, shown in FIGS. 3 and 4(a)–4(b), a drive plate 12 and a driven plate 15 of a clutch 11 are connected so as to be able to rotate freely relative to each other by means of a hole 12a and a spindle 15a. A ratchet claw 13 with a claw tooth 13a and an arm 13b is installed on a fixed spindle 12b of the drive plate 12 so as to rotate freely. An auxiliary element 17 is attached to a second fixed spindle 12c so as to also rotate freely. The auxiliary element 17 is attached so that its pointed end is inserted into the gap between a cam surface 13c molded into the inside of the pointed end of the ratchet claw 13 and the cam surface 15c of the driven plate 15. As shown in FIG. 4(a), the centroid m1 of the ratchet claw 13 and the centroid m2 of the auxiliary element 17 have the center of rotation of the clutch 11 between them.

According to the construction described above, when the device is used with the spindle of the drive plate 12 and of the driven plate 15 perpendicular to the direction of gravity, the directions of the centrifugal force F2 and of the gravitational force G2 that act on the centroid m2 of the auxiliary element 17 nearly coincide when the ratchet claw 13 moves to the top side, as shown in FIG. 4(a). The centrifugal force F1 and the gravitational force F2 acting on the centroid m1 cancel each other. The auxiliary element 17 is rotated clockwise about the fixed spindle 12c by a relatively large moment. Thus the cam surface 13c of the ratchet claw 13 connects with a pointed end of the auxiliary element 17 which pushes the ratchet claw toward the outside. A counter-clockwise moment is developed in the ratchet claw 13 about the fixed spindle 12b. Thus, even in the position shown in FIG. 4(a), the pressure of the claw tooth 13a on the cam surface 15c of the driven plate 15 is maintained.

As shown in FIG. 4(b), when the ratchet claw 13 has moved to the bottom side, the claw tooth 13a is pressed against the cam surface 15c by the centrifugal force and by gravity that act on the ratchet claw 13. If the force of gravity exceeds the centrifugal force on the auxiliary element 17, the auxiliary element 17 rotates in the counter-clockwise direction and its front edge touches the arm 13b of the ratchet claw 13. However, this does not lead to a conspicuous increase in the pressure of the ratchet tooth 13a on the cam surface 15c.

Third Embodiment

Figure 5:
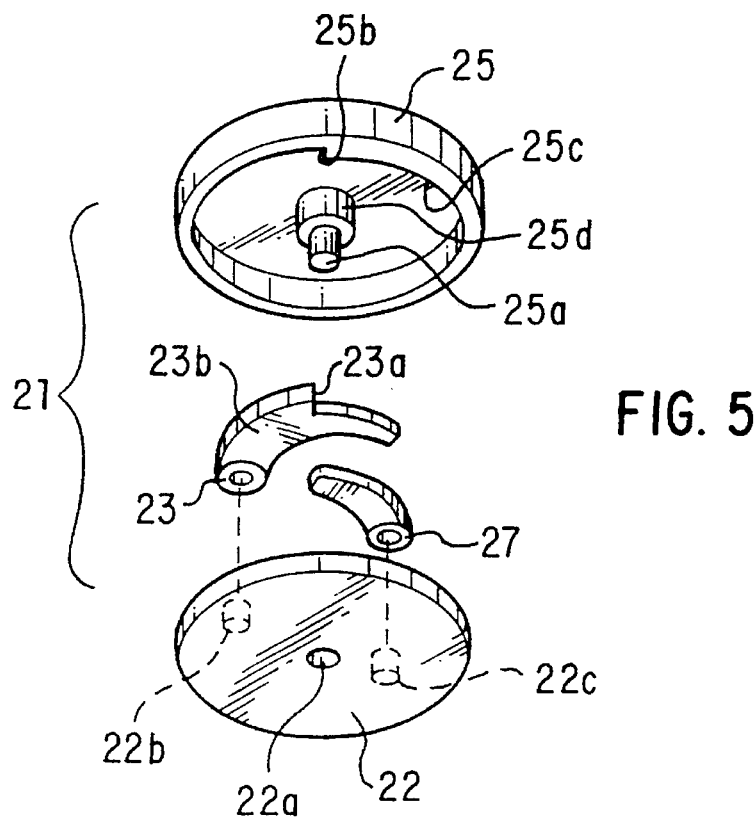
FIG. 5 is an oblique disassembled view that shows the construction of the third embodiment of a clutch in accordance with the present invention.
Figure 6A:
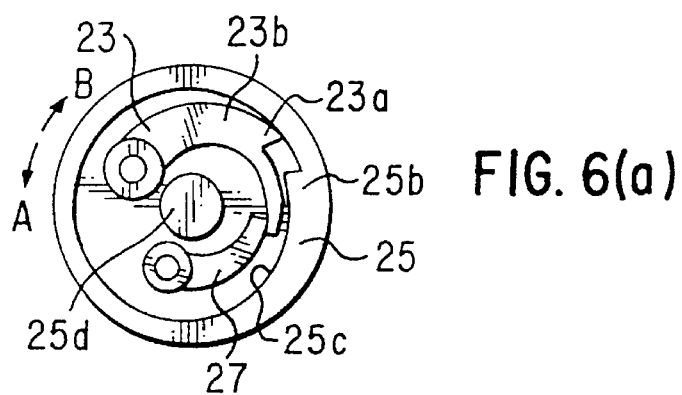
FIGS. 6(a) and 6(b) are plan views of the FIG. 5 embodiment that show the interior mechanism of the clutch of the third embodiment of the present invention.
Figure 6B:
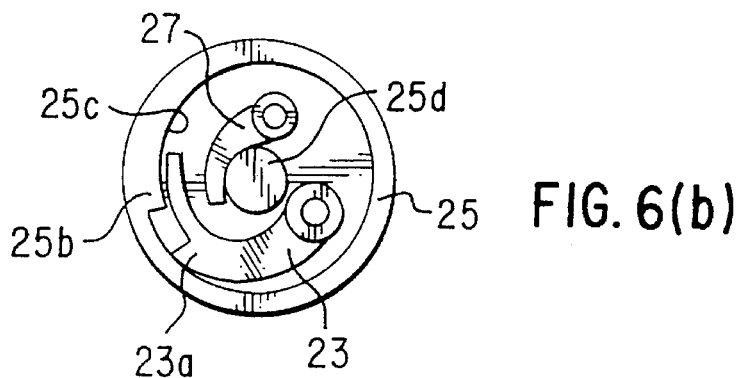
Figure 7:
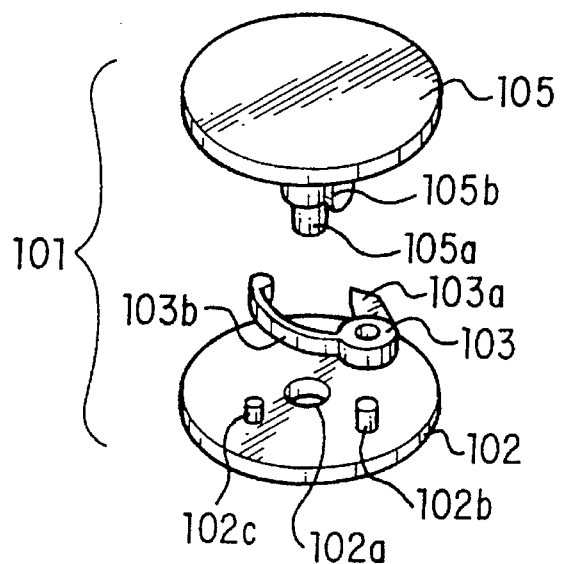
FIG. 7 is an oblique disassembled view that shows the construction of a conventional one-way clutch.
Figure 8A:
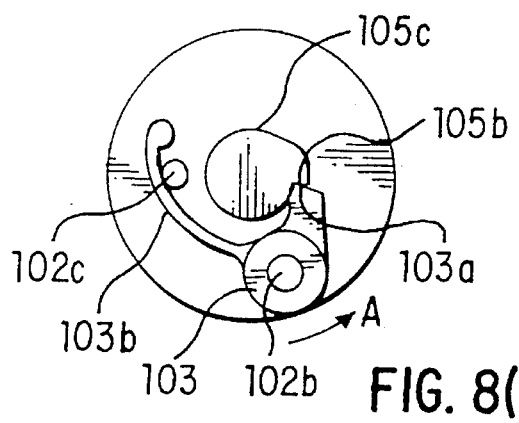
FIGS. 8 (a) and 8(b) are plan views that show the interior mechanism of the clutch of FIG. 7.
Figure 8B:
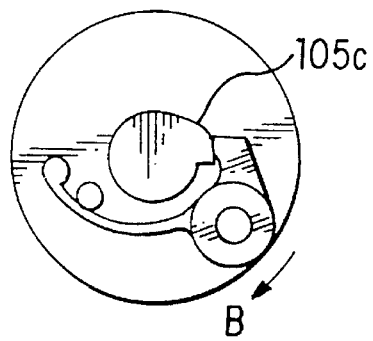

The third embodiment of the present invention is explained hereafter, with reference to FIGS. 5 and 6(a)–6(b). As shown, a drive plate 22 and a driven plate 25 of the clutch 21 of the present embodiment are joined by the hole 22a and the spindle 25a, which allow the plates to rotate freely. A ratchet claw 23 is installed onto a fixed spindle 22b of the drive plate 22 to rotate freely. An auxiliary element 27 is installed onto a second fixed spindle 22c of the drive plate 22 to rotate freely. The ratchet claw 23 has an arm 23b formed onto it extending to one side of the center of rotation of the drive plate 22. A claw tooth 23a is formed on the outside of the arm 23b. A cam surface 25c of the driven plate 25 is formed on the inside of an annular outer edge. A stepped portion 25b into which the claw tooth 23a may fit is formed into the cam surface 25c on the inside perimeter of the plate 25. The auxiliary element 27 is attached so that its pointed end is inserted between the inside perimeter of the ratchet arm 23b of the ratchet claw 23 and the larger diameter portion 25d of the spindle 25a of the driven plate 25.

With the described construction, when the ratchet claw 23 rotates in the counter-clockwise direction as shown in FIG. 6(a) through the centrifugal force accompanying the rotation of the drive plate 22, the claw tooth 23a is pushed against the cam surface 25c. Thus, when the drive plate 22 rotates in the clockwise direction (shown by arrow B in FIG. 6(a)) the claw tooth 23a connects with the stepped portion 25b, transmitting the rotation of the drive plate 22 to the driven plate 25. When the drive plate 22 rotates in the counter-clockwise direction (shown by arrow A in FIG. 6(a)) the claw tooth 23a slides past the cam surface 25c, allowing free rotation of the drive plate 22. If the device is used with the spindle of the drive plate 22 and of the driven plate 25 perpendicular to the direction of gravity, when the ratchet claw 23 has moved to the top as shown in FIG. 6(a), the ratchet claw 23 is forced in the counter-clockwise direction by the clockwise rotation of the auxiliary element 27 due to centrifugal force and the force of gravity, thus maintaining the pressure of the ratchet claw 23a on the cam surface 25c. In this example, when the ratchet claw 23 moves to the bottom side, as shown in FIG. 6(b), the auxiliary element 27 and the ratchet claw 23 separate. Therefore claw tooth 23a is pushed against the cam surface 25c by only the centrifugal force and gravitational force of the ratchet claw 23.

If the device is to be used with the spindle of the drive plate 22 and of the driven plate 25 oriented in the direction of gravity, or if the number of revolutions of the drive plate 22 is high and a centrifugal force sufficiently larger than the gravitational force is applied to the ratchet claw 23, the auxiliary element 27 may be omitted.

With the embodiments described above, drive plates 2, 12, and 22 comprise drive members, ratchet claws 3, 13, and 23 comprise rotation transmitting elements, claw teeth 3a, 13a and 23a comprise first engagement elements of the rotation transmission elements, driven plates 5, 15, and 25 comprise driven members, the cam surfaces 5c, 15c, and 25c along with stepped portions 5b, 15b, and 25b comprise second engagement elements of the driven members, and auxiliary elements 17 and 27 comprise auxiliary elements.

As described above, because the rotation in the disclosed embodiments of the present invention is transmitted through the connection of the first engagement element of the rotation transmitting element with the second engagement element through the centrifugal force that accompanies the rotation of the drive member, the first and second engagement elements can be pushed together by a smaller and more stable force than is used on a conventional clutch that uses an elastic force to force a first engagement element against a second engagement element. Thus the free rotation torque and the free rotation load torque that occur when the drive member rotates freely can be minimized. The rotation transmitting element can be made compact because no elastic force is used. Thus the clutch can be reduced in size.

With the invention of the second and third embodiments, because the rotation transmitting element is pushed by an auxiliary element, the first engagement element of the rotation transmitting element can be positively forced toward the second engagement element even when the centrifugal force and gravitational force of the rotation transmitting element cancel each other.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A one-way clutch comprising:

a rotatable drive member;

a rotation transmitting element pivotably attached to said rotatable drive member, said rotation transmitting element having a first engagement element;

a rotatable driven member having a second engagement element that is engageable with said first engagement element, wherein said second engagement element comprises a cam surface including a stepped portion located near a center of said rotatable driven member, and said rotation transmitting element has a center of gravity located so that upon rotation of said rotatable drive member in one direction, said first engagement element is urged by centrifugal force to pivot toward and engage said second engagement element; and an auxiliary element pivotably attached to said rotatable drive member, said auxiliary element having a center of gravity located so that upon rotation of said rotatable drive member in said one direction, said auxiliary element is urged by centrifugal force to rotate toward and engage said rotation transmitting element, further urging said first engagement element toward said second engagement element.

2. The one-way clutch of claim 1, wherein said rotatable drive member and said rotatable driven member are rotatably connected to each other by a hole in one of said rotatable drive member and said rotatable driven member for receiving a spindle which is formed on the other of said rotatable drive member and said rotatable driven member.

3. The one-way clutch of claim 1, wherein said rotation transmitting element comprises a ratchet claw and said first engagement element comprises a claw tooth on said ratchet claw that is engageable with said stepped portion.

4. The one-way clutch of claim 3, wherein said rotatable drive member includes a spindle fixed to said rotatable drive member, and said ratchet claw is pivotably mounted on said fixed spindle.

5. The one-way clutch of claim 4, wherein said rotation transmitting element includes an arm extending on the side of said fixed spindle opposite to said ratchet claw, said arm being larger than said ratchet claw so that the center of gravity of said rotation transmitting element is located on the arm side of said fixed spindle.

6. The one-way clutch of claim 1, wherein said rotatable drive member includes a spindle fixed to said rotatable drive member, and said auxiliary element is pivotably mounted on said fixed spindle.

7. The one-way clutch of claim 1, wherein said rotatable drive member includes a spindle fixed to said rotatable drive member, and said rotation transmitting element is pivotably mounted on said fixed spindle.

8. The one-way clutch of claim 7, wherein said rotation transmitting element includes an arm extending on the side of said fixed spindle opposite to said first engagement element, said arm being larger than said first engagement element.

9. A one-way clutch comprising:
   a rotatable drive member;
   a rotatable driven member;
   connecting means for connecting said rotatable drive member to said rotatable driven member when said rotatable drive member rotates in a first direction but not when said drive member rotates in a second direction opposite to said first direction, said connecting means including urging means for urging said connection means toward a position of connection of said rotatable drive member with said rotatable driven member by the action of centrifugal force generated upon rotation of said rotatable drive member when said rotatable drive member rotates in said first direction, wherein said position of connection is located near a center of said rotatable driven member; and an auxiliary means for urging said connecting means toward said position of connection by the action of said centrifugal force.

10. The one-way clutch of claim 9, wherein said connecting means is attached to said rotatable drive member for rotation with said rotatable drive member.

11. The one-way clutch of claim 9, wherein said rotatable drive member includes a spindle fixed to said rotatable drive member and said auxiliary means is mounted on said fixed spindle.

* * * * *